J. L. TAYLOR, DEC'D.
E. A. TAYLOR AND B. A. MATTHEWS, EXECUTRICES.
CLAMP.
APPLICATION FILED JUNE 21, 1918.
1,393,718.
Patented Oct. 11, 1921.
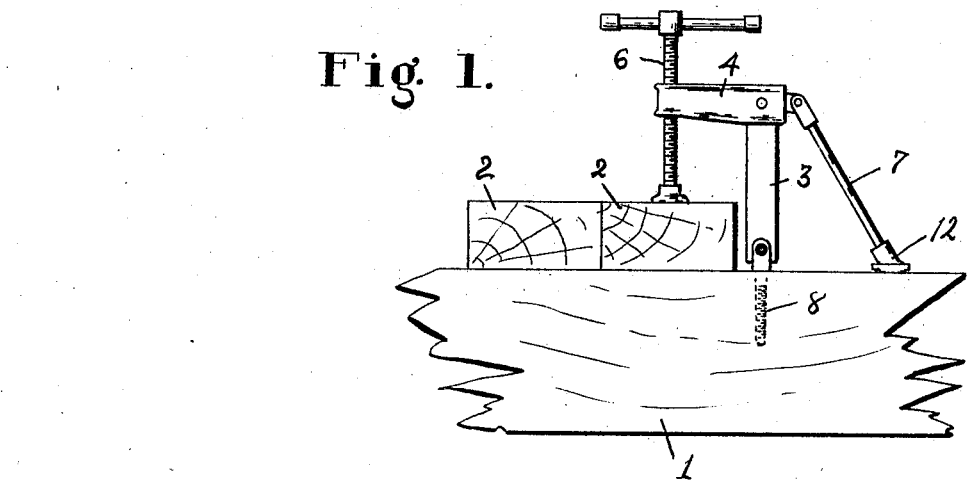
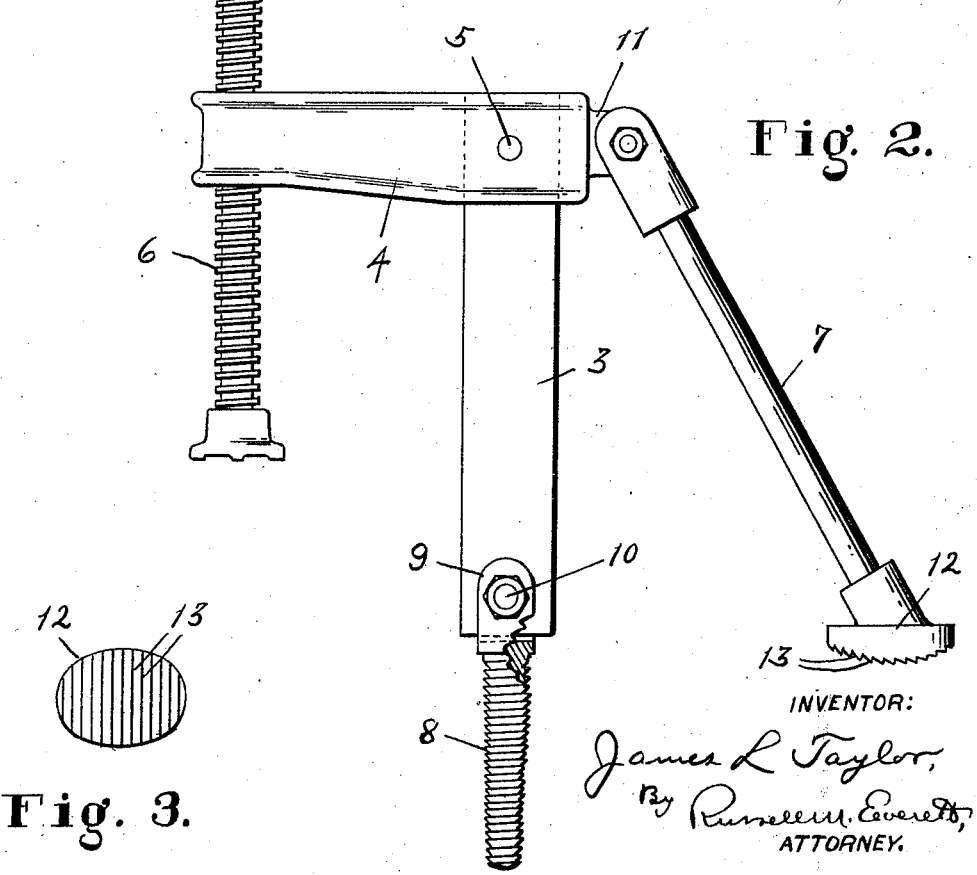

UNITED STATES PATENT OFFICE.

JAMES L. TAYLOR, OF POUGHKEEPSIE, NEW YORK; EMMA A. TAYLOR AND BESSIE A. MATTHEWS, EXECUTRICES OF SAID JAMES L. TAYLOR, DECEASED.

CLAMP.

1,393,718.     Specification of Letters Patent.     Patented Oct. 11, 1921.

Application filed June 21, 1918. Serial No. 241,146.

*To all whom it may concern:*

Be it known that I, JAMES L. TAYLOR, a citizen of the United States, and a resident of Poughkeepsie, in the county of Dutchess and State of New York, have invented new and useful Improvements in Clamps, of which the following is a specification.

This invention relates to clamps to be used in ship building, for holding the planks against the ribs in position to be secured thereto, and more especially the invention relates to clamps which are used where there is no opportunity to get an anchorage between the ribs of the vessel.

The objects of the invention are to provide such a clamp with an improved inclined brace which will secure a firm and stable hold upon the surface which it engages; to provide an anchoring screw separate from the clamp bar and pivoted thereto, so that the clamp bar has a limited swinging motion; to thus prevent breakage at the joint between the screw and bar, and also enable the brace to be more firmly set; to thus enable the bar and screw to be made of different materials, each particularly adapted to the demands upon it, and to obtain other advantages and results as may be brought out in the following description.

Referring to the accompanying drawings, in which like numerals of reference indicate the same parts throughout the several views, Figure 1 is an elevation illustrating the use of my improved clamp;

Fig. 2 is a similar view of the clamp on larger scale, and

Fig. 3 is a detail view of the engaging surface of the bracing foot.

In the specific embodiment of the invention shown in said drawing, 1 indicates a rib of a vessel or the like and 2, 2 planks which are bent into place thereon under such conditions that access between the ribs is impossible. My improved clamp comprises a bar 3, to one end of which is rigidly secured a head. In practice, this head is forced on by great pressure and pinned, as at 5, so that a very rigid relation of the head and bar is obtained. In the projecting end of the head 4 works the clamping screw 6 as is common, and at the opposite side of the bar 3 the brace 7 is connected to the head, as will be hereinafter more fully described.

It will be understood that the bar 3 projects perpendicularly from the work, as shown in Fig. 1, and for securing it in this position its end next the work or away from the head 4 is provided with an anchoring screw 8. This anchoring screw is adapted to be screwed into the rib 1 at the proper place, as shown in Fig. 1, and at its head is forked to receive the end of the bar 3, the arms 9, 9 lying on opposite sides of said bar and receiving a bolt 10 or other suitable fastening means extending through said arms and the bar. Preferably said fastening means is removable, so as to allow a workman to go ahead and put in the anchoring screws and then the clamp men attach the clamp as they come along. Besides this advantage, the separability of the bar and anchoring screw enables each to be made of the most appropriate material, so that each performs its function in the most advantageous and effective manner. Furthermore, a small pivotal or hinge motion is allowed between the screw and bar in use of the clamp, which secures very important and valuable results as will be hereinafter described.

I have shown this accomplished by squaring the end of the bar 3 away from its head 4, so that said end forms a transverse shoulder, and also forming a similar transverse shoulder in the crotch of the fork of the anchoring screw, said shoulders being parallel and spaced when the bar and screw are alined, but adapted to engage each other as soon as said parts swing slightly out of alinement. Any other equivalent construction could be employed, however.

It will be understood that the anchoring screw 8 prevents the clamp bar 3 from lifting away from the rib 1 when the clamping screw 6 is tightened against the plank 2, and to resist lateral movement of said bar 3 the brace 7 is provided. This brace is hinged to a suitable ear 11 on the head 4 and adapted to extend downwardly outward at a suitable angle in the plane of the clamp, being provided at its lower end with a foot 12 to engage the surface of the rib 1, as shown in the drawing. This foot is perferably curved at its under surface in the plane of the clamp and is toothed transversely to said curvature as at 13. Furthermore, the foot is oval or elliptical in plan, so that the teeth 13 at the middle of the foot are longer than those at the ends. This insures that when the foot begins to grip two or three long teeth 13 will sink into the surface first, thus quickly securing a positive grip, and as they sink farther and farther, other teeth engage the surface to secure a still better grip.

In the use of my improved clamp, after the bar has been hingedly secured to the fixed anchoring screw in place in the rib of a vessel, said bar is tilted in the direction of the work, out of a perpendicular position. Then the brace 7 is jammed into bracing position with its foot engaging the rib as described, and when the clamping screw 6 exerts sufficient pressure upon the plank being operated upon, the bar 3 yields into substantially perpendicular position as the foot 12 embeds itself. The clamp is then in a very firm, stable position and the desired pressure can be exerted upon the work. When the clamping screw is released from the finished work, the bar 3 can be tilted to release the brace 7, and the whole clamp readily removed.

It will be understood that if the bar 3 was not first tilted a little toward the work, as described above, the yielding of the brace 7 as its foot 12 bites into the rib would result in said bar 3 standing out of perpendicular or leaning away from the work, so that the clamping screw 6 would not be perpendicular to the work. Said foot 12 of the brace 7 sinks into different ribs to different extents, according to the nature of the wood, and the workman soon becomes skilled in variably tilting the bar 3 so that it will come into perpendicular position when the foot of the brace has sunk as far as it will under the pressure in that particular rib. Obviously if the anchoring screw 8 were not hinged to the bar 3 the bending due to the action above described would soon break them apart, and it will also be seen that if said screw and bar were loosely hinged together, so that they could swing out of relative position or alinement, much time would be lost in getting them into proper relative position and holding them there until the work was engaged. It is therefore important to have the anchoring screw and bar 3 hinged together, so that while enough rocking is permitted for the purpose above described, any further hinge motion is prevented, and for this reason I have employed the spaced shoulders or stops above described; they are far enough apart, as shown in Fig. 2, to allow the necessary pivotal movement and at the same time keep the anchoring screw and bar in substantial alinement.

Detail changes and modifications may be made in the manufacture of my improved clamp without departing from the spirit and scope of the invention, and I do not wish to be understood as restricting myself except as required by the following claims when construed in the light of the prior art.

Having thus described the invention, what I claim is:

1. In the clamp of the character described, the combination with a bar having a laterally projecting head with a clamping screw, and a hinged brace at the opposite side from said head, of an anchoring screw hingedly connected to the end of said bar away from said head, and coöperating stop means on said anchoring screw and bar permitting a limited hinge movement and yet holding the bar in working position when the anchoring screw is embedded.

2. In the clamp of the character described, the combination with a bar having a laterally projecting head with a clamping screw, and a hinged brace at the opposite side from said head, of an anchoring screw hingedly connected to the end of said bar away from said head, and pairs of coöperating stops on said anchoring screw and bar adapted to prevent them from swinging out of working alinement with each other.

3. In a clamp of the character described, the combination with a bar having a laterally projecting head with a clamping screw, and a hinged brace at the opposite side from said head, said bar having a transverse shoulder at its end away from said head, of an anchoring screw hingedly connected to said end of said bar away from the head and having a transverse shoulder spaced from said shoulder of the bar when the bar and screw are alined, whereby said bar and screw have a limited movement with respect to each other in the plane of the clamp.

4. In a clamp of the character described, the combination with a bar having a laterally projecting head with a clamping screw, and an inclined brace at the opposite side from said head, of an anchoring screw having a forked head receiving the end of the bar opposite the clamp head, and a pivotal pin connecting said bar and forked head of the screw.

5. In a clamp of the character described, the combination with a bar having a laterally projecting head with a clamping screw, and an inclined brace at the opposite side from said head, of an anchoring screw having a forked head receiving the end of the bar opposite the clamp head, and means for releasably and pivotally connecting said bar and forked screw head.

6. In a clamp of the character described, the combination with a bar having a laterally projecting head with a clamping screw, and an inclined brace at the opposite side from said head, of an anchoring screw pivotally connected to the end of said bar away from the head so as to allow relative movement in the plane of the bar, head and brace, said brace having a foot rounded in said plane and toothed transversely thereof.

7. In a clamp of the character described, the combination with a bar having a laterally projecting head with a clamping screw, and an inclined brace at the opposite side from said head, of an anchoring screw pivotally connected to the end of said bar away from the head so as to allow relative movement in the plane of the bar, head and brace, said brace having a foot rounded in said plane and toothed transversely thereof the teeth being longest at the middle of the foot and decreasing in length toward both ends of it.

JAMES L. TAYLOR.